March 14, 1939.  W. J. HITCHCOCK  2,150,549

RAZOR BLADE OR OTHER CUTTING EDGE

Filed March 23, 1936

INVENTOR

William J. Hitchcock

UNITED STATES PATENT OFFICE 2,150,549

RAZOR BLADE OR OTHER CUTTING EDGE

William J. Hitchcock, Scotia, N. Y.

Application March 23, 1936, Serial No. 70,190

2 Claims. (Cl. 30—350)

The present invention relates to any keen tool edge, chiefly to those used for cutting non-metallic substances, but through a choice of suitable materials is adaptable to metal cutting tools.

It is the object of my invention to form a laminar structure, having outer layers of some tough and strong material such as steel and a core of some extremely thin and hard material such as glass, or a very hard and strong alloy, which will not corrode, and which preferably will be shattered to a needle like structure at its exposed edge by the difference in heat expansion between it and the supporting layers on both sides of it, while attaching them firmly together.

The principle underlying the invention is that hard materials are inherently strong, fine glass fibres supporting a greater weight than the best steel, but being in general brittle need appropriate support if a thin and therefore keen edge is to be formed of them which will resist fracture by forces acting from the side. They are; however, excellent glues and may be used as a thin layer to attach a supporting layer to themselves even when there is a considerable difference in the heat expansion of the supporting layer and the core material. In such a case there is a tendency for the exposed edge of hard material to fracture with cracks perpendicular to its edge so that the structure of the edge is a comb like one in the cracks of which material being cut may be subjected to higher pressures than by simple contact with an edge, however thin, and without a tendency to bend the material being cut, as the pressure upon it is from both sides.

Figure 1:
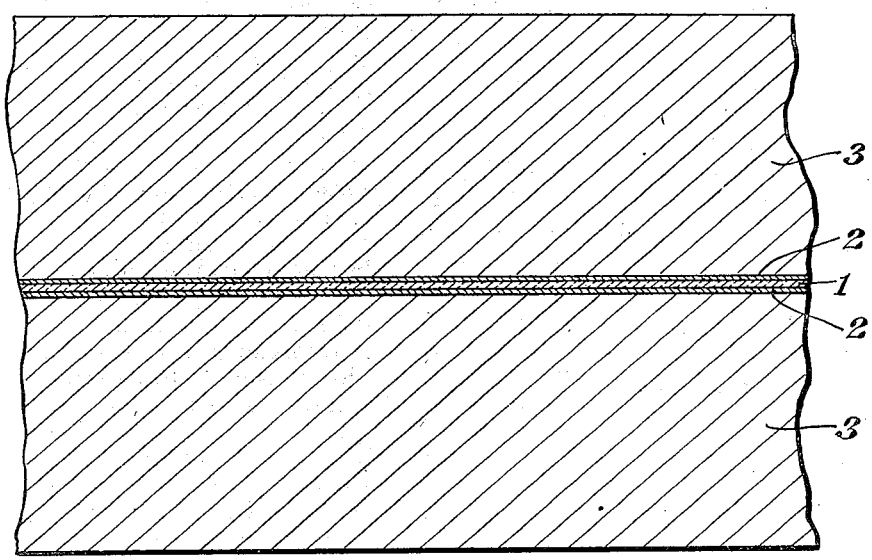
Figure 2:
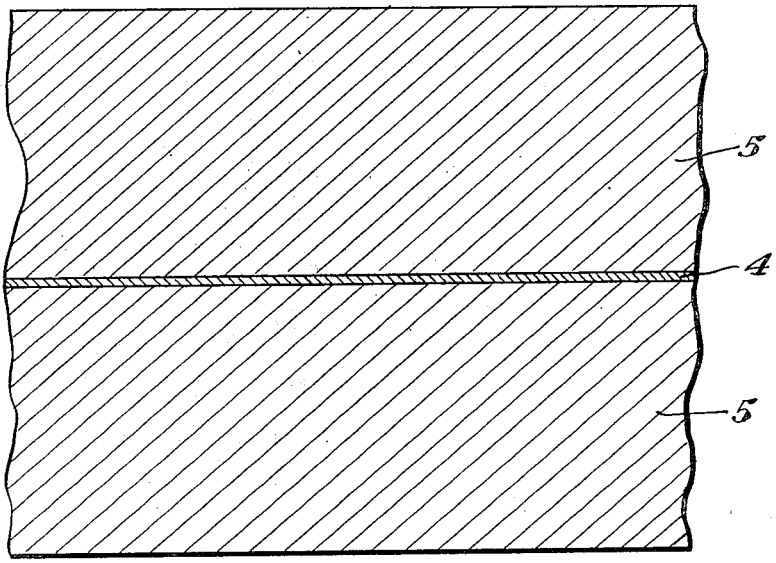

Referring to the drawing, Figure 1 illustrates a section perpendicular to the flat side of the blade through laminae consisting of glass and layers attached to and supporting the glass. Figure 2 is a similar sectional view of a like structure made up entirely of chemical metallic elements.

I have discovered that when an edge need resist only low temperatures the objects of the invention are best met by such a structure as that illustrated in Figure 1, where 1 is an inner sheet of glass, 2 are layers of borated copper fused to the glass, and 3 are layers of steel to which the copper has been fused or electroplated. An edge that will resist rather high local cutting temperatures is illustrated in Figure 2 where the inner layer 4 was initially a mixture of copper and tungsten powder in finely divided form which has been fused to the outer layers of steel 5 thus uniting all layers into one integral whole, having a core that in the finished article seems to consist mostly of a tungsten steel, most of the copper having disappeared into the main body of the steel. About one-tenth as much copper is used as tungsten, by weight, but the proportions are not critical.

In the first embodiment of the invention, the glass layer should be thin, uniform in thickness and free from bubbles or spots where the glass has become devitrified. This is best attained by borating the copper as is done with the lead wires of incandescent lamps when it is desired to seal them through glass, inserting a thin rod of heated lead or lime glass and then applying heat and pressure to the strips of metal. The heat may be either that of a furnace, or that of hot rolls, or it may be applied electrically as is done in welding together the two dissimilar metals that are used for thermostats. The strips can then be sheared at a point where they contain glass and shaped and sharpened by usual methods.

In the second embodiment of the invention, the heat applied is most advantageously that of a hydrogen furnace whose temperature is high enough to fuse the copper completely, which results in an alloy with the tungsten and steel and the practically complete disapperance of the copper, leaving a homogenous appearing strip but which nevertheless has a core of tungsten steel. This may be rolled or hammered, if desired, without fracturing the bond and may be considerably reduced in thickness by this procedure. Such traces of copper as are left appear to be effective in reducing corrosion of the actual edge, which as is well known is one considerable cause of the loss of keenness in such articles as razor blades. The composite body is then sharpened by the usual methods as above described, so that the tungsten steel forms the actual cutting edge.

I claim:

1. A cutting member comprising a laminar blade having a sharpened cutting edge formed from the material of the interior of the blade, said blade comprising outer layers of metal and an inner layer of virteous material attached to the said outer layers.

2. A cutting member comprising a laminar blade having a sharpened cutting edge formed from the material of the interior of the blade, said blade comprising outer layers of metal and a thinner and harder interior layer of non-corrosive alloy formed between said outer layers by fusion between a metal in the sixth column of the periodic table of the elements, part of the metal of the outer layers, and another easily fusible metal alloying with both metals.

WILLIAM J. HITCHCOCK.